(12) United States Patent
Cordova et al.

(10) Patent No.: US 10,217,055 B2
(45) Date of Patent: Feb. 26, 2019

(54) METHODS AND SYSTEMS FOR SENSOR-BASED DRIVING DATA COLLECTION

(71) Applicant: TRUEMOTION, INC., Boston, MA (US)

(72) Inventors: Brad Cordova, Cambridge, MA (US); Joe Adelmann, Cambridge, MA (US)

(73) Assignee: TRUEMOTION, INC., Boston, MA (US)

( * ) Notice: Subject to any disclaimer, the term of this patent is extended or adjusted under 35 U.S.C. 154(b) by 0 days.

(21) Appl. No.: 15/866,949

(22) Filed: Jan. 10, 2018

(65) Prior Publication Data

US 2018/0197101 A1    Jul. 12, 2018

Related U.S. Application Data

(63) Continuation of application No. 15/149,613, filed on May 9, 2016, now Pat. No. 9,892,363.
(Continued)

(51) Int. Cl.
*G06N 7/00* (2006.01)
*G06Q 10/00* (2012.01)
(Continued)

(52) U.S. Cl.
CPC .............. *G06N 7/005* (2013.01); *G06Q 10/00* (2013.01); *G07C 11/00* (2013.01); *G08G 1/005* (2013.01);
(Continued)

(58) Field of Classification Search
CPC ........ G06N 7/005; H04W 4/38; H04W 4/027; H04W 4/00; H04W 4/40; H04W 4/02;
(Continued)

(56) References Cited

U.S. PATENT DOCUMENTS 7,701,363 B1    4/2010   Zlojutro et al.
9,892,363 B2    2/2018   Cordova et al.
(Continued)

OTHER PUBLICATIONS

U.S. Appl. No. 15/149,613, "Non-Final Office Action", dated Feb. 24, 2017, 15 pages.
(Continued)

*Primary Examiner* — Yuen H Wong
(74) *Attorney, Agent, or Firm* — Kilpatrick Townsend & Stockton LLP

(57) ABSTRACT

A system for collecting vehicle data includes a mobile device comprising a plurality of sensors, a memory, and a processor coupled to the memory. The processor is configured to perform operations including obtaining a plurality of movement measurements from at least one of the plurality of sensors in the mobile device, determining a plurality of transportation modes using the plurality of movement measurements, and determining a mode transition using the plurality of transportation modes. The operations also include determining a transition probability using the mode transition. The operations further include creating a transition model using the transition probabilities, determining that the transition model indicates that a probability that the second transportation mode comprises driving is above a threshold, obtaining a plurality of driving movement measurements from at least one of the plurality of sensors, and determining the vehicle data using the driving movement measurements.

18 Claims, 6 Drawing Sheets

Related U.S. Application Data

(60) Provisional application No. 62/158,305, filed on May 7, 2015.

(51) Int. Cl.

| | | |
|---|---|---|
| *G07C 11/00* | (2006.01) | |
| *H04W 4/00* | (2018.01) | |
| *H04W 4/02* | (2018.01) | |
| *G08G 1/005* | (2006.01) | |
| *G08G 1/01* | (2006.01) | |
| *H04W 4/38* | (2018.01) | |
| *H04W 4/04* | (2009.01) | |
| *H04W 4/40* | (2018.01) | |

(52) U.S. Cl.
CPC ......... *G08G 1/0112* (2013.01); *G08G 1/0129* (2013.01); *G08G 1/0141* (2013.01); *H04W 4/00* (2013.01); *H04W 4/027* (2013.01); *H04W 4/38* (2018.02); *H04W 4/02* (2013.01); *H04W 4/046* (2013.01); *H04W 4/40* (2018.02)

(58) Field of Classification Search
CPC ... H04W 4/046; G08G 1/0141; G08G 1/0129; G08G 1/0112; G08G 1/005; G06Q 10/00; G07C 11/00
See application file for complete search history.

(56) References Cited

U.S. PATENT DOCUMENTS

| | | |
|---|---|---|
| 2002/0198632 A1 | 12/2002 | Breed et al. |
| 2004/0078210 A1 | 4/2004 | Segelbaum et al. |
| 2004/0225421 A1 | 11/2004 | Wu et al. |
| 2008/0195428 A1 | 8/2008 | O'Sullivan et al. |
| 2010/0205012 A1 | 8/2010 | McClellan et al. |
| 2012/0109721 A1 | 5/2012 | Cebon et al. |
| 2014/0180730 A1 | 6/2014 | Cordova et al. |
| 2014/0188788 A1 | 7/2014 | Bridgen et al. |
| 2015/0005016 A1* | 1/2015 | Palanki ................. H04W 4/027 455/456.6 |
| 2015/0094951 A1 | 4/2015 | Loschen et al. |
| 2015/0369836 A1 | 12/2015 | Cordova et al. |
| 2016/0328893 A1 | 11/2016 | Cordova et al. |

OTHER PUBLICATIONS

U.S. Appl. No. 15/149,613, "Notice of Allowance", dated Oct. 4, 2017, 17 pages.

* cited by examiner

METHODS AND SYSTEMS FOR SENSOR-BASED DRIVING DATA COLLECTION

CROSS-REFERENCES TO RELATED APPLICATIONS

This application is a continuation of U.S. application Ser. No. 15/149,613, filed May 9, 2016; which claims priority to U.S. Provisional Patent Application No. 62/158,305, filed on May 7, 2015. The disclosures of each are hereby incorporated by reference in their entirety for all purposes.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

In order to use mobile devices to track drivers as they are driving in cars, as well as their driving behaviors, it is helpful to determine the transportation mode of the user of the mobile device as a function of time, for example, whether the person is, walking, biking, driving, or the like. Despite the progress made in relation to providing data related to drivers and their vehicles, there is a need in the art for improved methods and systems related to determining modes of transportation that are utilized by users of mobile devices.

SUMMARY OF THE INVENTION

Embodiments of the present invention relate to transportation systems. More particularly, embodiments relate to methods and systems of vehicle data collection by a user having a mobile device. In a particular embodiment, vehicle movement data collected using a mobile device is analyzed to create a model that can be used to operate the sensors of the mobile device when the probability of driving is above a threshold.

In order to track drivers and their driving behaviors using mobile devices, it is helpful to have the mobile device tracking a driver during a drive without making the driver turn sensors on and off to track the drive.

According to an embodiment of the present invention, a system for collecting vehicle data is provided. The system includes a mobile device comprising a plurality of sensors, a memory, and a processor coupled to the memory. The processor is configured to perform operations including obtaining a plurality of movement measurements from at least one of the plurality of sensors in the mobile device and determining a plurality of transportation modes using the plurality of movement measurements. The processor is also configured to perform operations including determining a mode transition using the plurality of transportation modes. A mode transition is associated with a change from a first transportation mode of the plurality of transportation modules to a second transportation mode of the plurality of transportation modes. The processor is further configured to perform operations including determining a transition probability using the mode transition. The transition probability is associated with a probability of a change from the first transportation mode to the second transportation mode. The processor is additionally configured to perform operations including creating a transition model using the transition probabilities, determining that the transition model indicates that a probability that the second transportation mode comprises driving is above a threshold, obtaining a plurality of driving movement measurements from at least one of the plurality of sensors, and determining the vehicle data using the driving movement measurements.

According to another embodiment of the present invention, a method for collecting vehicle data is provided. The method includes obtaining a plurality of movement measurements from at least one movement sensor in a mobile device and determining a plurality of transportation modes using the plurality of movement measurements. The method also includes determining a mode transition using the plurality of transportation modes. A mode transition is associated with a change from a first transportation mode of the plurality of transportation modules to a second transportation mode of the plurality of transportation modes. The method further includes determining a transition probability using the mode transition. The transition probability is associated with a probability of a change from the first transportation mode to the second transportation mode. The method additionally includes creating a transition model using the transition probabilities, determining that the transition model indicates that a probability that the second transportation mode comprises driving is above a threshold, obtaining a plurality of driving movement measurements from at least one movement sensor of the mobile device, and determining the vehicle data using the driving movement measurements.

Numerous benefits are achieved by way of the present invention over conventional techniques. For example, embodiments of the present invention provide an accurate method of building a risk profile for a driver. By utilizing embodiments of the present invention, methods and systems are provided that can use mobile device sensors to monitor movement only at selected times likely to be during a drive. Accordingly, embodiments can collect movement information about a drive without requiring a user to directly activate the sensors, thereby increasing the likelihood that driving data will be collected without the need to modify the behavior of the driver. In embodiments, turning mobile device sensors on and off in a selective way also leads to less consumption of mobile device battery power. Thus, the collection of driving data does not hinder the normal operation of a mobile device. These and other embodiments of the invention along with many of their advantages and features are described in more detail in conjunction with the text below and attached figures.

Figure 1:
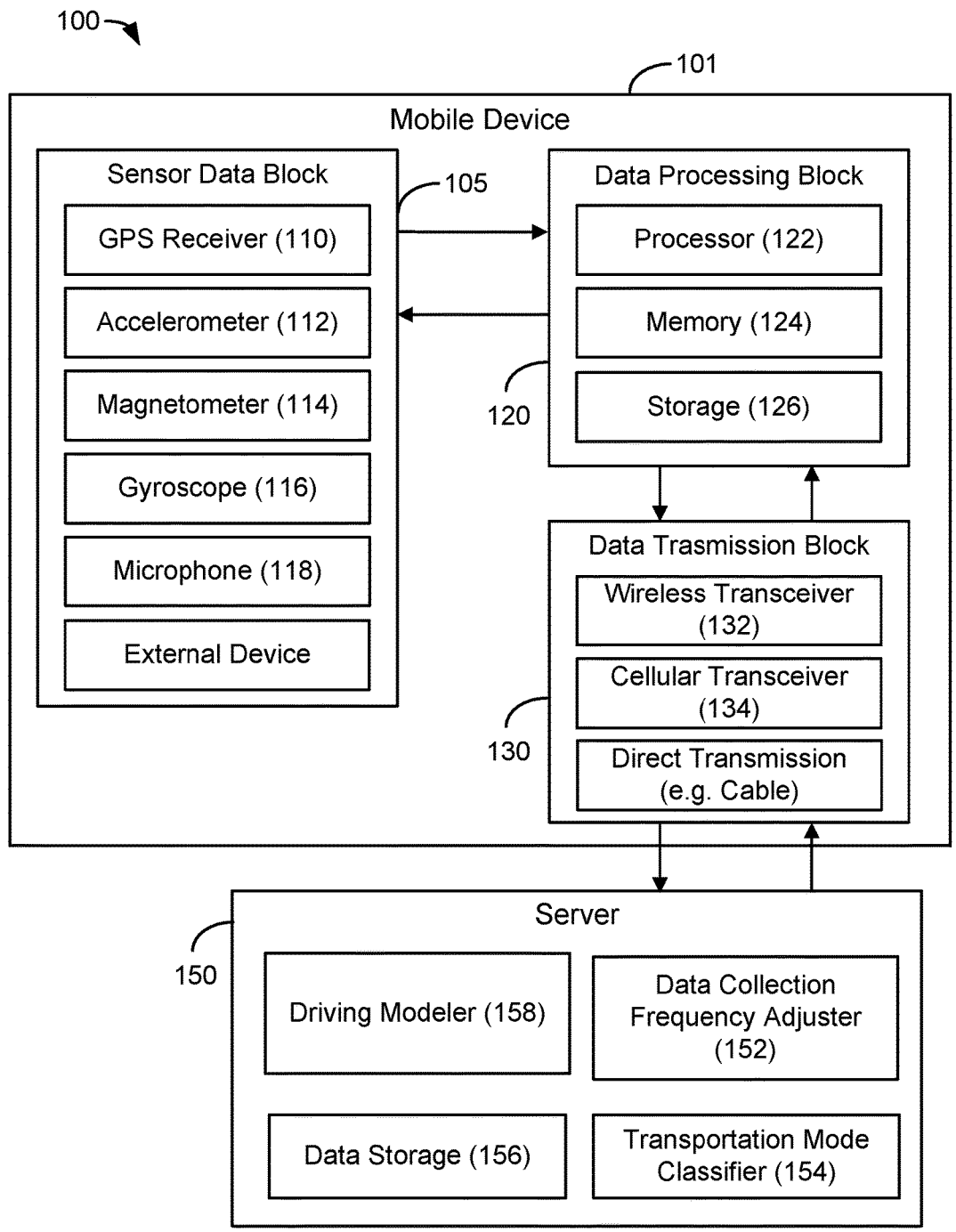
FIG. 1 is a simplified system diagram illustrating a driving behavior tracking system according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Embodiments of the present invention utilize mobile devices to provide information on a user's behaviors during transportation. For example, a mobile device carried by a user could be used to analyze driving habits. As would be appreciated by one having skill in the relevant art(s), given the description herein, in order to measure driving behaviors using sensors in a mobile device, it would be helpful to have the sensors of the mobile device turn on close in time to when the driving behavior begins and turn off close in time to when the driving behavior ends without direct user (i.e., a driver) involvement. It should be appreciated that, as used herein, the term "sensors turning off" is meant to describe deactivating aspects of one or more sensors on the mobile device (e.g., to reduce power consumption) and does not necessarily mean deactivating all aspects of any one sensor, or all sensors on the device.

As an example, if a person carries a mobile device with them and enters a vehicle as a driver, some embodiments described herein can estimate a high likelihood that a driving event, also referred to as a drive, is taking place and operate the sensors on the mobile device to collect data without manipulation of the device by the user. After the driving event (i.e., the drive) ends, some embodiments can estimate the likelihood that the drive has ended and cease operation of the sensors on the mobile device. Estimates of the likelihood of a drive can be assisted by the creation of a model of driving likelihood for a particular driver associated with the mobile device (also termed herein as a driving model). Embodiments can improve the collection of driving data by modeling the environment in which a user is operating, and using high-frequency data collection when the user is likely to be driving or about to drive.

The driving model can be created and updated using a broad range of information, including information about different determined modes of transportation. For example, if, instead of driving a vehicle, the person carrying the mobile device uses another form of transportation, such as a bus, ferry, subway, or train, data collected while using these modes of transportation can be integrated into the model to assist future estimates of the likelihood that a drive is taking place. In addition, information gathered about the transition from one mode of transportation to another mode (e.g., from walking to riding on a bus) can be integrated into a transition model (e.g., a type of driving model) to assist with driving likelihood estimations.

FIG. 1 is a simplified system diagram illustrating a system 100 for collecting driving data according to an embodiment of the present invention. System 100 includes a mobile device 101 having a number of different components. Mobile device 101 includes a sensor data block 105, a data processing block 120, and a data transmission block 130.

The sensor data block 105 includes data collection sensors as well as data collected from these sensors that are available to mobile device 101. This can include external devices connected via Bluetooth, USB cable, etc. The data processing block 120 includes storage 126, and manipulations done to the data obtained from the sensor data block 105. This includes, but is not limited to, subsampling, filtering, reformatting, etc. Data transmission block 130 includes any transmission of the data off the phone to an external computing device that can also store and manipulate the data obtained from sensor data block 105.

Embodiments of the present invention discuss a system for collecting driving data in terms of mobile devices, and embodiments of the present invention are not limited to any particular mobile device. As examples, a variety of mobile devices including sensors such as accelerometers 112, gyroscopes 116, location determination systems such as global positioning system (GPS) receivers 110, communications capabilities, and the like are included within the scope of the invention. Example mobile devices include mobile phones, smart watches, fitness monitors, Bluetooth headsets, tablets, laptop computers, movement analysis devices, and other suitable devices. One of ordinary skill in the art would recognize many variations, modifications, and alternatives.

The system for collecting driving data also can include a server 150 that communicates with the mobile device 101. The server 150 provides functionality including data collection frequency adjuster 152, driving model builder 158, and transportation mode classifier 154 as discussed in relation to FIGS. 2A-3 below. These components are executed by processors (not shown) in conjunction with memory (not shown). Server 150 also includes data storage 156.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive." With many mobile devices 101, the sensors used to collect data are components of the mobile device 101, and use power resources available to mobile device 101 components, e.g., mobile device battery power and/or a data source external to mobile device 101.

Figure 2A:
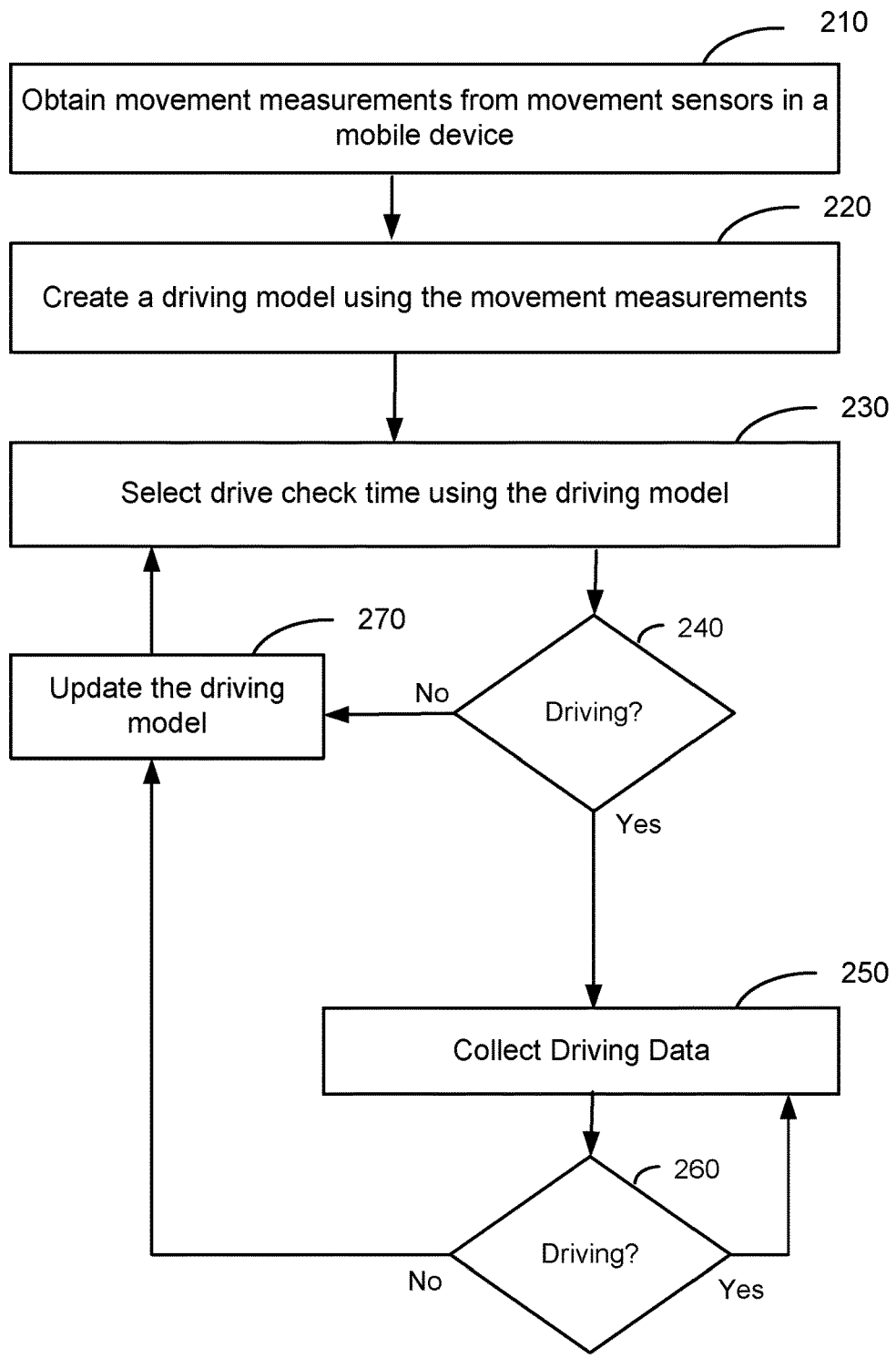
FIG. 2A is a simplified flowchart illustrating a method of creating and using a driving model to collect driving data according to an embodiment of the present invention.

FIG. 2A is a simplified flowchart illustrating a method of collecting driving data using a driving model according to an embodiment of the present invention. The method illustrated in FIG. 2A initially collects data from mobile device sensors and builds a driving model that is later used to control the sensors for driving data collection. The method includes obtaining movement measurements from movement sensors in a mobile device (210).

The movement measurements can be obtained, for example, using sensor data block 105 in mobile device 101, e.g., a smart phone or other suitable mobile device. The collected data can include location data (e.g., GPS receiver 110 data) as a function of time, accelerometer 112 data, and gyroscope 116 data, combinations thereof, or the like. In some embodiments, in order to prolong battery life, only location/GPS data, accelerometer data, or gyroscope data is utilized, whereas in other embodiments, the data is supplemented and combined. One of ordinary skill in the relevant art(s) would recognize many variations, modifications, and alternatives.

Once movement measurements are collected, the method creates a driving model using the movement measurements (220). Referring back to FIG. 1, this driving model can be created using driving modeler 158. As discussed further with respect to FIG. 2B below, one type of driving model can be created using the movement measurements as training data for a classifier. Another type of driving model that can be generated and used by embodiments is a transportation mode transition model (also termed herein as a transition model). To create this model, the collected data are analyzed and different modes of transportation are estimated, along with the times the particular transportation mode began and ended.

Each transition between one mode of transportation and another is analyzed for inclusion in the transition model. For example, transitioning from walking to riding a bus is one transition, as is from riding a bus to riding on a train. Each user has different patterns associated with their use of transportation modes, and their transition between multiple modes. These different patterns can be incorporated into the transition model to improve the driving likelihood estimations described herein. Transition models can be used to predict the most likely series of transition events to happen, both on a per user level and on a global level. For example, a typical person may be far more likely to transition from walking to driving, than from riding a bus to driving.

For example, collected data over time may show that a first person (as a person who parks a car and rides a subway) has frequent transitions from train to walking to driving, while another user frequently goes from subway to walking to riding a bus. In this example, when embodiments detect the first person walking, applying the transition model could assign a higher probability of an upcoming drive than for the second user.

In some embodiments, the time of day and day of week are also incorporated in the model. Using this approach, the first user may, in the morning, on weekdays, always walk, then drive a car to the train station, then park. For this user, when a walk is detected in the morning on a weekday, the likelihood that a drive will follow could be set even higher. In embodiments, holidays and other days particular to a user can also be integrated into the generated model.

Features derived from each determined mode of transportation in the collected data can also be analyzed to highlight features that are in common among similar modes, and different among different modes. For example, determining the Fourier frequency of a collected movement measurement signal, can, in some cases, be a good distinguishing factor between walking and driving.

One example of data collection and analysis used by embodiments to determine transportation mode information is included in U.S. patent application Ser. No. 15/149,628, which is hereby incorporated by reference in its entirety for all purposes.

It should be appreciated that the specific steps illustrated in FIG. 2A provide a particular method of collecting driving data using a driving model according to an embodiment of the present invention. Other sequences of steps may also be performed according to alternative embodiments. For example, alternative embodiments of the present invention may perform the steps outlined above in a different order. Moreover, the individual steps illustrated in FIG. 2A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2B:
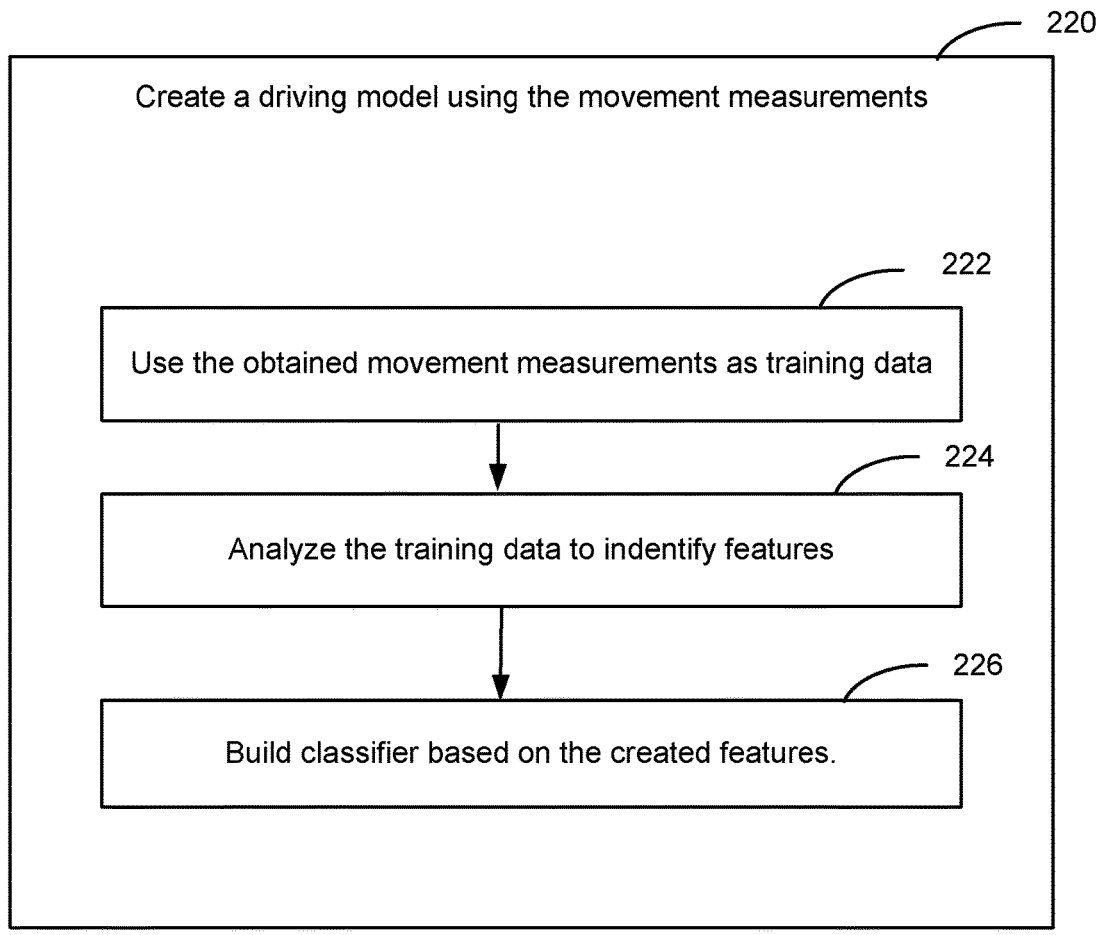
FIG. 2B is a simplified flowchart illustrating additional details regarding creating and using a driving model to collect driving data according to an embodiment of the present invention.

FIG. 2B is a simplified flowchart illustrating a method of creating a driving model using movement measurements (220) according to an embodiment of the present invention. The method illustrated in FIG. 2B initially collects data from mobile device sensors and builds a driving model that is later used to control the sensors for driving data collection. The method includes obtaining movement measurements from movement sensors in a mobile device (210).

The method shown in FIG. 2B begins with the use of the use of the collected movement measurements as training data (222). One way that this can be done is to collect movement measurements when the activity of the user is identified. For example, when movement measurements are collected from a mobile device while the mobile device user is walking and only walking, and the data can be labeled as "walking" data. Driving data can be collected in a similar fashion.

Once a sufficiently large amount of movement measurements are collected for different transportation modes, the training data is analyzed to identify features (224). These features are characteristics that can be indicative of different transportation modes, and they can be used in the model to analyze unknown data. Features can be identified from raw movement data, such as data collected from an accelerometer, gyroscope and/or magnetometer.

Example types of features identified include frequency features, statistical features, principle component analysis (PCA) features, and derived kinematic quantity features. Frequency features can include the identification of: low, medium, and high frequency ratio components; fast Fourier transform (FFT) coefficients; and wavelet coefficients.

Statistical features can include a mean, a median, a standard deviation, a crest factor, and a root mean square. An assessment of how symmetrical the distribution of the data is (i.e., skewness) can be considered, as well as a measure of how closely the shape of the data distribution matches the Gaussian distribution of the obtained data (Kurtosis). PCA component features can include the variance, and variance ratio of the obtained movement measurements.

Derived kinematic quantity features can include a gravity vector, a rotation angle around gravity vector and a measure of acceleration along gravity vector.

One example of data collection and analysis used by embodiments to determine and analyze acceleration using a gravity vector is included in U.S. patent application Ser. No. 15/149,603, which is hereby incorporated by reference herein in its entirety for all purposes. Once features have been created by embodiments, a classifier can be built based on the created features (226). This classifier can be used to analyze unknown movement measurements using a collection of identified features.

Returning to FIG. 2B, once the driving model is created, operation shifts to the collection of driving data for tracking purposes. In this phase, some embodiments are directed to collecting as much information about user drives as possible without direct user input, and while operating the sensors of mobile device 101 for as little as possible, thus conserving the battery life of mobile device 101. Toward this end, the method uses Data Collection Frequency Adjuster (152) and one or more generated models to select a time of day to turn on the sensors of mobile device 101 (also termed herein a drive check time) to check whether a drive is taking place (230). Ideally, this drive check time would be at the beginning of a drive, but even if this starting time is missed, significant driving behavior data can be collected. The data collected during the trip can be utilized to perform driver identification, score the driver's behavior during the trip, or the like. Additional description related to performing driver identification and scoring of driver's behavior is provided in U.S. patent application Ser. No. 14/139,510, filed on Dec. 23, 2013; U.S. patent application Ser. No. 14/192,452, filed Feb. 27, 2014, now U.S. Pat. No. 8,862,486; U.S. patent application Ser. No. 14/477,519, filed Sep. 4, 2014; U.S. Provisional Patent Application No. 62/286,218, filed Jan. 22, 2016; U.S. Provisional Patent Application No. 62/320,226, filed Apr. 8, 2016; and U.S. Provisional Patent Application No. 62/210,710, filed Aug. 27, 2015; the disclosures of which are hereby incorporated by reference in their entireties for all purposes.

Drive check times can be selected by analyzing a created transition model for the user. One approach to selecting a drive time determines a probability of driving (also termed herein "Dp") throughout the day. When the determined Dp value for a time rises above a threshold, a drive check time is scheduled.

As discussed above, for a particular user, a drive may normally take place in the morning, following a walking mode of transportation. For another user, a drive may normally take place soon after riding a bus in the afternoon. For both of these users, embodiments can keep sensors on their mobile devices turned off until a drive check time is selected based on their transition models.

One having skill in the relevant art(s), given the disclosure herein, would appreciate different variations and approaches to creating driving models for use by embodiments.

It should be appreciated that the specific steps illustrated in FIG. 2B provide a particular method of creating a driving model using movement measurements according to an embodiment of the present invention. Other sequences of steps may also be performed according to alternative embodiments. For example, alternative embodiments of the present invention may perform the steps outlined above in a different order. Moreover, the individual steps illustrated in FIG. 2B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
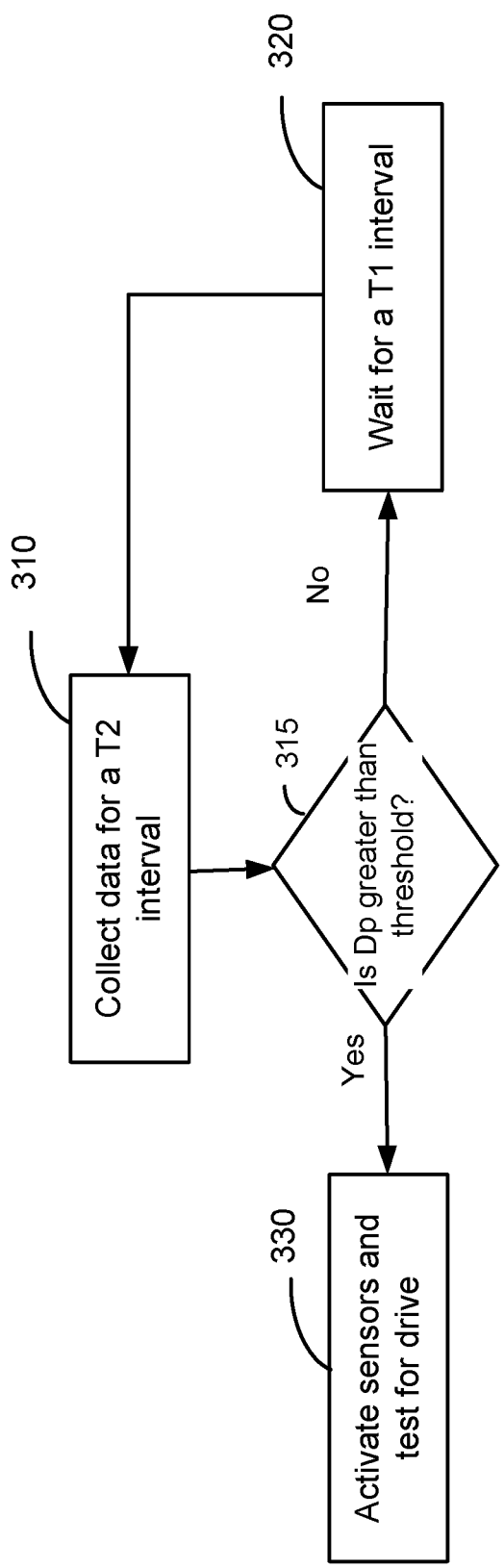
FIG. 3 is a simplified flowchart illustrating a method of using intervals to select a time to check for a drive according to an embodiment of the present invention.

FIG. 3 is a simplified flowchart illustrating a method of using intervals to select a time to check for a drive according to an embodiment of the present invention. The method illustrated in FIG. 3 can use data collection frequency adjuster (152) to implement another approach to selecting a drive check time. In this approach, mobile device 101 is configured to wait a first interval of time (320, T1), and then collect a certain number of samples (S) for a second interval of time (310, T2) at a particular sample frequency (F). In an example implementation, T1=40 seconds, T2=4 seconds, S=3, and F=5 Hz. One having skill in the relevant art(s), with access to the disclosure herein, would appreciate that different values can have different beneficial results. For every T2 set of samples collected, a Dp is determined, and when this probability exceeds a threshold (315), sensors can be activated to test for a drive (330) as described below.

It should be appreciated that the specific steps illustrated in FIG. 3 provide a particular method of using intervals to select a time to check for a drive according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Returning to FIG. 2A, once an interval has expired, and/or a drive check time has been selected, mobile device 101 sensors can be activated and movement measurements can be collected to determine whether a drive is taking place (240). If a drive is not taking place, then this collected data is used to update the driving model (270) and a new drive check time is selected (230). If a drive is detected, embodiments collect driving data (250) and continually check to determine that the drive is continuing (260). When the drive ends, the data collected can also be used to update the driving model (270).

In another example based on FIG. 2A, probability bands can be used to classify the estimated Dp, and these bands can be used to select a check time using the driving model (230). These bands can also be applied to the T1 interval technique applied above.

Figure 5:
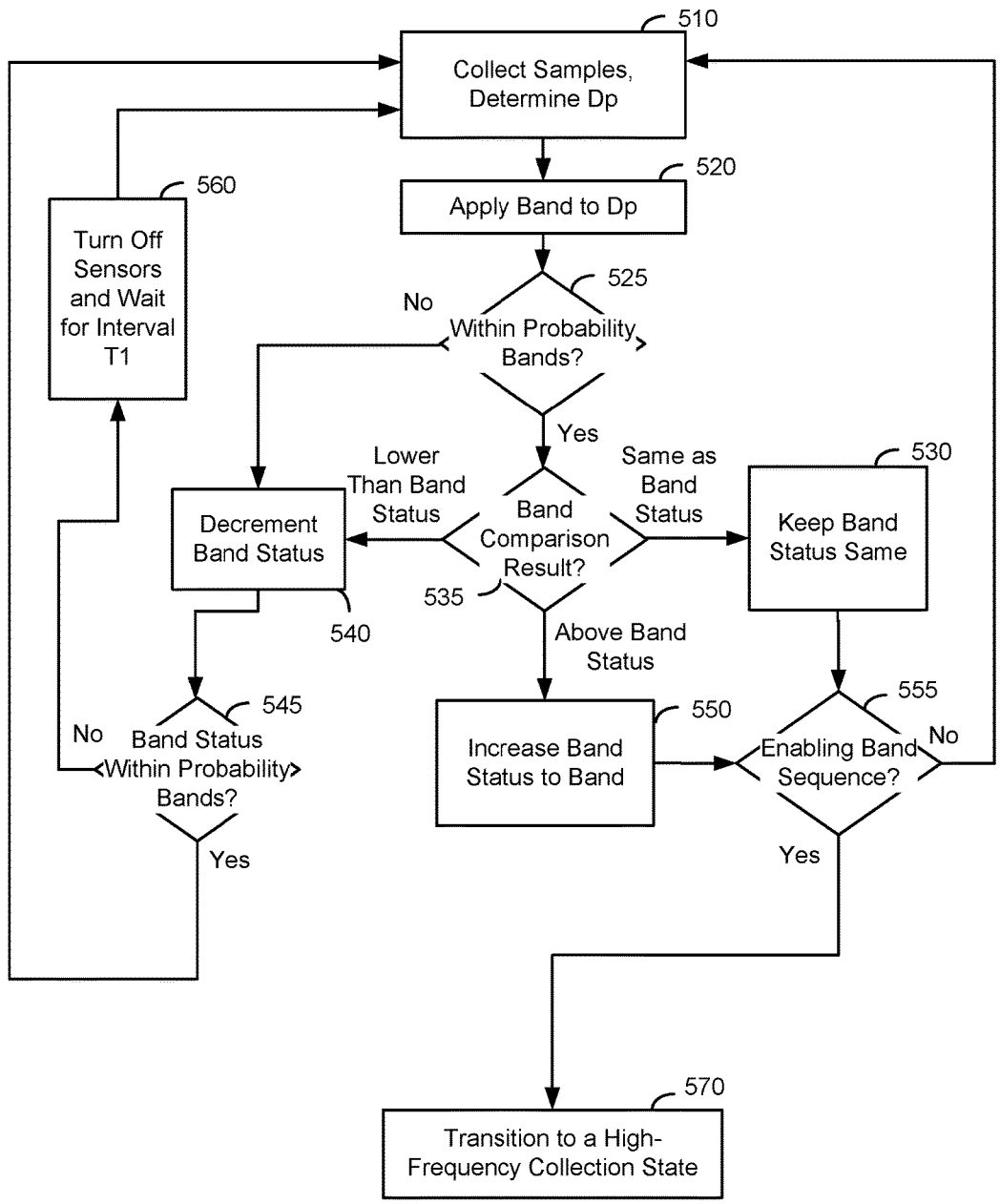
FIG. 5 is a simplified flowchart illustrating a method of collecting driving data according to an embodiment of the present invention.

FIG. 5 is a simplified flowchart illustrating a method of using probability bands to set a drive check time according to an embodiment of the present invention. The method illustrated in FIG. 5 enables some embodiments to select a time to activate the sensors of the mobile device and test for a drive using a determined Dp value and an interval (e.g., T1 from FIG. 3). The method begins with the collection of samples from mobile device sensors, and a determination of Dp (510). As discussed above, this probability of a driving can be determined by embodiments using different sources of information, e.g., a determined transportation mode transmission model, or other suitable driving model.

After the Dp value is determined, a probability band is applied based on the Dp value (520). In an example, three Dp bands are used to describe ranges of probability (e.g., B1, B2, and B3), and these respectively correspond to $0.3 <= Dp < 0.5$, $0.5 <= Dp < 0.7$, and $0.7 <= Dp < 1.0$. (B1 corresponding to the lowest probability and B3 corresponding to the highest). For example, when a Dp is determined to be 0.4, this is classified as band B1. Not every Dp value may be covered by a band (e.g., in this example Dp=0.1 has no B1-B3 band value, and can be described as "outside the bands"). These three example bands are used herein to describe some embodiments with reference to FIG. 5, but in different embodiments, additional numbers of bands and bands having different probability ranges can be used.

As the method operates, a "band status" (also termed an "application status" or "app status") can be maintained to describe the current driving probability status. In the current example, as described above, when the band status is B2, the application probability that a drive is taking place is greater than or equal to 0.5 (50%) and less than 0.7 (70%). The band status of the system can change based on the Dp results of new samples. Band status and/or combinations of multiple band determinations can be used to determine different system functions.

In one approach, probability bands applied to collected samples can be tested and, as described below, after certain conditions are met, the one or more sensors of the mobile device are activated to collect driving data. Because this state can involve more mobile device sensors collecting data at a high rate, it can also be termed herein as a high-frequency collection state. It would be appreciated by one having skill in the relevant art(s) that this state consumes power at a rate higher than the drive check states discussed above. In some embodiments, using bands can be beneficial because they enable the system to respond slower to probability changes. This slower response can improve the accuracy of system estimations in some circumstances.

Continuing the example, after the probability band has been applied to the determined Dp (520), a check can be made to determine whether the Dp value falls within the defined probability bands (Dp=0.1 has no B1-B3 band value, and is outside the bands). A rule can be applied where band status can only drop one level at a time based on new probability determinations. For example, when the current band status is B2, when a new Dp is determined that is outside the bands, the band status is decremented (540) down to B1. In another example, when the current band status is B1, and a Dp is determined that is outside the bands, when the band status is decremented (540), the band status has now dropped outside the bands. When the system determines that the band status (i.e., likelihood of a drive taking place) has dropped to this low point (545), in some embodiments, the sensors are turned off and an interval must pass (560) before more drive check samples are collected (510).

When a determined Dp value is determined to be inside the bands, a comparison can be made with the current band status (535), and the band status can also be changed based on the comparison. Applying the rule described above where band status can only drop one level at a time based on new probability determinations, when the new Dp band value is lower than the current band status, the band status is decremented by one (540). In this example, decrementing by one is performed regardless of the amount of difference between the new Dp value and the band status. For example, if the current band status is B3 and a new Dp band of B1 is determined, the band status drops to B2.

When the new Dp band is determined by band comparison (535) to be the same as the band status, then the band status remains the same (530). When the new Dp band is determined by band comparison (535) to be the above the current band status, then the band status is raised to the value of the band status (550). This increase of band status (550) occurs regardless of the difference between the new Dp value determined and the band status. For example, when a new Dp band is determined to be B3, and the current band status is B1, then the new band status is increased to B3. It should be appreciated that the examples above are only example embodiments, and different incrementing and decrementing approaches for band status can be used by embodiments.

In some embodiments, in order to transition to a high-frequency collection state (570), an enabling sequence of Dp band values must be determined over the course of multiple sets of collected samples (510). In an example sequence that uses the B1-B3 bands discussed above, over three determined Dp bands, the first determined Dp band must be at least B1, the second determined Dp band must at least be B2 and the third determined Dp band must be B3. For example, the following determined Dp values would be an enabling band sequence that would be tested (555) and cause the mobile device to transition to a high-frequency collection state (570): 0.4 (B1), 0.6 (B2), 0.8 (B3). It should be appreciated that the example enabling sequence described is only one approach that can be used by some embodiments, and no sequences, or different sequences can be used by different embodiments.

It should be appreciated that the specific steps illustrated in FIG. 5 provide a particular method of using probability bands to set a drive check time according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments can use band sequence checks to activate sensors because it can lead to better tradeoffs between various competing factors. These factors include, but are not limited to, the tradeoffs between immediate event detection and superior battery life. If more bands and/or higher band thresholds are used, battery life is likely to improve, but sensor activation will not happen as frequently (i.e., the potential to miss events of interest may increase). If fewer bands and/or lower band thresholds are used, battery life is likely to decrease, but sensor activation will happen more frequently (i.e., the potential to catch all events of interest may increase but so might the potential to catch false positives). Various numbers and types of bands can be used with either discrete or continuous thresholds. Decisions can be made using these thresholds based on either binary outputs or probabilities, depending on the desired outcome and the number of factors. Types of triggering events include, but are not limited to, turning sensors on and off, changing sensor data collection frequency, alerting a user, setting or canceling a timer, and other similar types of triggering events. One having skill in the relevant art(s), given the description herein would appreciate other ways for using band sequence checks to advantageously control mobile device sensors.

Figure 4:
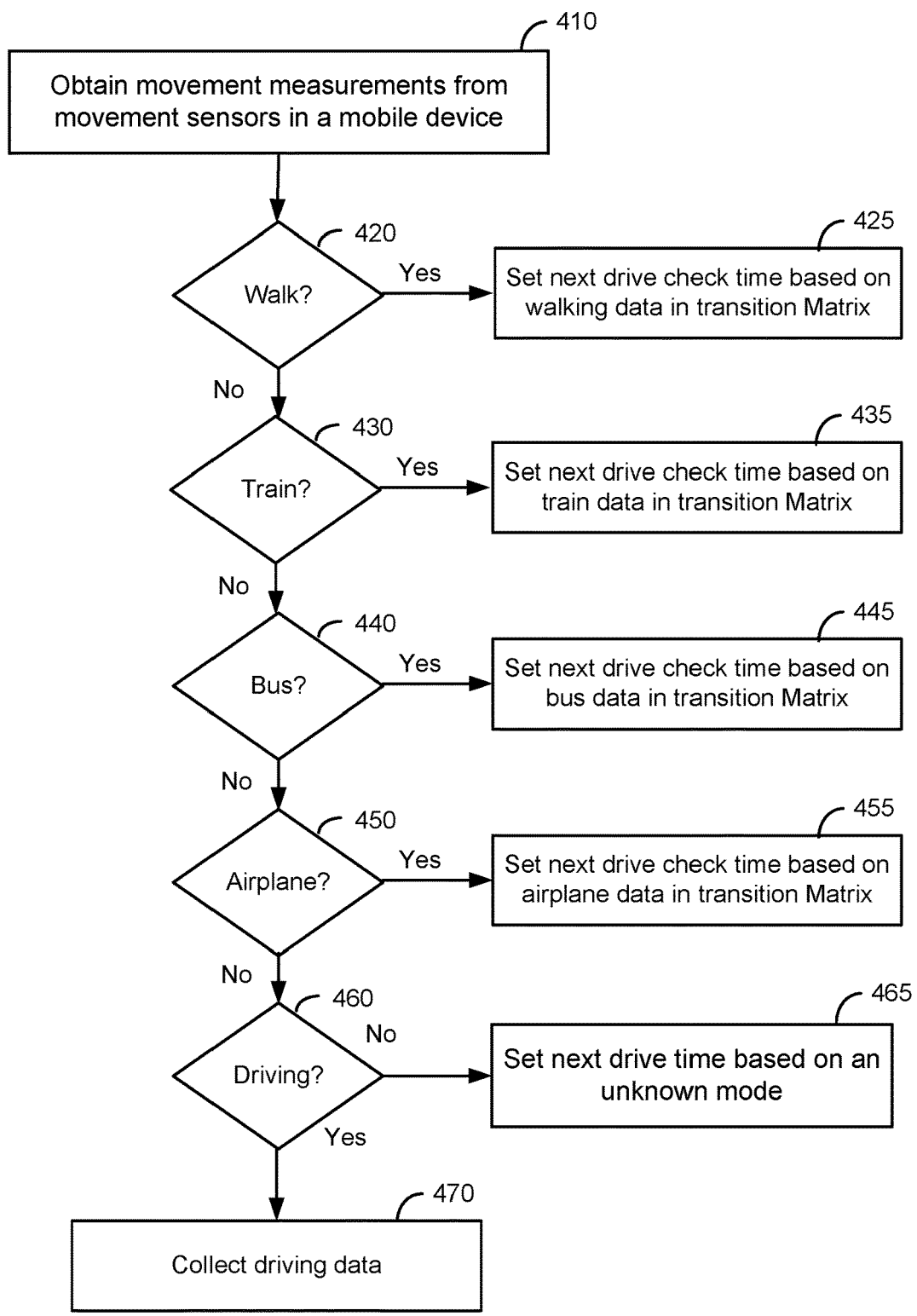
FIG. 4 is a simplified flowchart illustrating a method of collecting driving data using different transportation modes according to an embodiment of the present invention.

FIG. 4 is a simplified flowchart illustrating a method of collecting driving data using a model according to an embodiment of the present invention. The method illustrated in FIG. 4 can use transportation mode classifier 158 to analyze the movement measurements and determine a likely transportation mode for the user. The determined mode can be used to set a drive check time based on previously collected data (e.g., the driving model created (220) with reference to FIG. 2). The determined transportation mode can also be used to select T1, T2, S, and F.

The method includes obtaining movement measurements from movement sensors in a mobile device (410). As discussed above, these movement measurements can be combined with contextual data related to the location of the user, e.g., whether the user is on a freeway (e.g., driving), or on a taxiway at an airport (e.g., on a plane).

The method also includes determining if the collected movement measurements indicate a high likelihood that the user is currently walking (420). When a high likelihood of walking is determined, the next drive check time and/or testing interval can be set based on walking data in a transition matrix associated with the user (425).

The method also includes determining if the collected movement measurements indicate a high likelihood that the user is currently on a train (430). When a high likelihood of being on a train is determined, the next drive check time and/or testing interval can be set based on train data in a transition matrix associated with the user (435).

The method also includes determining if the collected movement measurements indicate a high likelihood that the user is currently on a bus (440). When a high likelihood of being on a bus is determined, the next drive check time and/or testing interval can be set based on bus data in a transition matrix associated with the user (445).

The method also includes determining if the collected movement measurements indicate a high likelihood that the user is currently in an airplane (450). When a high likelihood of being on an airplane is determined, the next drive check time and/or testing interval can be set based on airplane data in a transition matrix associated with the user (455).

The method also includes determining if the collected movement measurements indicate a high likelihood that the user is currently driving (460). When a high likelihood of driving is determined, data can be collected (470) until embodiments detect that driving as ceased. If all modeled transportation modes have been applied to the obtained movement measurements, but no match is found, a drive time and/or testing interval can be set based on an unknown mode of transportation (465).

It should be appreciated that the specific steps illustrated in FIG. 4 provide a particular method of collecting driving data using a model according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A system for collecting vehicle data, the system comprising:
    a mobile device of a user comprising a plurality of sensors;
    a memory; and
    a processor coupled to the memory, wherein the processor is configured to perform operations including:
        obtaining a plurality of movement measurements from at least one of the plurality of sensors in the mobile device;
        determining a plurality of transportation modes using the plurality of movement measurements, wherein determining includes:
            assigning a plurality of first movement measurements of the plurality of movement measurements to a first transportation mode of the plurality of transportation modes, wherein the first transportation mode includes driving by the user of the mobile device; and
            assigning a plurality of second movement measurements of the plurality of movement measurements to a second transportation mode of the plurality of transportation modes;
        identifying a plurality of first features of the first transportation mode using the plurality of first movement measurements;
        identifying a plurality of second features of the second transportation mode using the plurality of second movement measurements;
        obtaining a plurality of new movement measurements from the at least one of the plurality of sensors in the mobile device;
        extracting a plurality of new features from the plurality of new movement measurements;
        associating the first transportation mode with the plurality of new movement measurements based on a comparison of the plurality of new features to the plurality of first features and the plurality of second features; and
        operating the at least one of the plurality of sensors at an increased frequency of sampling of the vehicle data based on the association of the first transportation mode with the plurality of new movement measurements.

2. The system of claim 1, wherein the memory and the processor are located on a server in a cloud.

3. The system of claim 1, wherein the memory and the processor are located in the mobile device.

4. The system of claim 1, wherein the plurality of sensors includes a gyroscope, an accelerometer, and a GPS.

5. The system of claim 1, wherein determining the plurality of transportation modes includes determining a Fourier frequency of a subset of the plurality of movement measurements.

6. The system of claim 1, wherein the plurality of first features includes at least one of frequency features, statistical features, principle component analysis (PCA) features, and derived kinematic quantity features.

7. The system of claim 6, wherein the frequency features include at least one of fast Fourier transform (FFT) coefficients and wavelet coefficients.

8. The system of claim 6, wherein the statistical features include at least one of a mean, a median, a standard deviation, a crest factor, and a root mean square.

9. The system of claim 6, wherein the derived kinematic quantity features include at least one of a gravity vector, a rotation angle around gravity vector, and a measure of acceleration around gravity vector.

10. A method for collecting vehicle data, the method comprising:
    obtaining, by a processor, a plurality of movement measurements from at least one of a plurality of sensors in a mobile device;
    determining, by the processor, a plurality of transportation modes using the plurality of movement measurements, wherein determining includes:
        assigning a plurality of first movement measurements of the plurality of movement measurements to a first transportation mode of the plurality of transportation modes, wherein the first transportation mode includes driving by a user of the mobile device; and
        assigning a plurality of second movement measurements of the plurality of movement measurements to a second transportation mode of the plurality of transportation modes;
    identifying, by the processor, a plurality of first features of the first transportation mode using the plurality of first movement measurements;
    identifying, by the processor, a plurality of second features of the second transportation mode using the plurality of second movement measurements;
    obtaining, by the processor, a plurality of new movement measurements from the at least one of the plurality of sensors in the mobile device;
    extracting, by the processor, a plurality of new features from the plurality of new movement measurements;
    associating, by the processor, the first transportation mode with the plurality of new movement measurements based on a comparison of the plurality of new features to the plurality of first features and the plurality of second features; and
    operating, by the processor, the at least one of the plurality of sensors at an increased frequency of sampling of the vehicle data based on the association of the first transportation mode with the plurality of new movement measurements.

11. The method of claim 10, wherein assigning the plurality of second movement measurements of the plurality of movement measurements to the second transportation mode is based on contextual data.

12. The method of claim 11, wherein the contextual data includes at least one of schedules and route data for trains and buses.

13. The method of claim 10, wherein the plurality of sensors includes a gyroscope, an accelerometer, and a GPS.

14. The method of claim 10, wherein determining the plurality of transportation modes includes determining a Fourier frequency of a subset of the plurality of movement measurements.

15. The method of claim 10, wherein the plurality of first features includes at least one of frequency features, statistical features, principle component analysis (PCA) features, and derived kinematic quantity features.

16. The method of claim 15, wherein the frequency features include at least one of fast Fourier transform (FFT) coefficients and wavelet coefficients.

17. The method of claim 15, wherein the statistical features include at least one of a mean, a median, a standard deviation, a crest factor, and a root mean square.

18. The method of claim 15, wherein the derived kinematic quantity features include at least one of a gravity vector, a rotation angle around gravity vector, and a measure of acceleration around gravity vector.

* * * * *